United States Patent [19]

Mitchell

[11] Patent Number: 5,094,456

[45] Date of Patent: Mar. 10, 1992

[54] RAKE HEAD AND RAKE HEAD/GOLF CLUB COMBINATION FOR USE IN RAKING GOLF COURSE SAND TRAPS

[75] Inventor: Robert K. Mitchell, Lenoir, N.C.

[73] Assignee: Creative Ideas, Inc., Lenoir, N.C.

[21] Appl. No.: 645,201

[22] Filed: Jan. 24, 1991

[51] Int. Cl.$^5$ .......................... A01B 1/20; A63B 53/00
[52] U.S. Cl. .................. 273/162 F; 172/380; 294/19.2
[58] Field of Search ............. 273/162 B, 162 F, 32 R, 273/32 B, 32 F, 32 H; 294/19.2; 172/713, 378, 379, 380, 381

[56] References Cited

U.S. PATENT DOCUMENTS

| | | | |
|---|---|---|---|
| 2,110,538 | 3/1938 | Walsh | 56/400.21 X |
| 2,721,755 | 10/1955 | Walner | 56/400.19 X |
| 3,440,810 | 4/1969 | Rhyme | 56/400.01 |
| 3,870,300 | 3/1975 | Amendola | 273/162 F X |
| 4,411,463 | 10/1983 | Alderman | 273/162 B |
| 4,741,150 | 5/1988 | Saksun | 56/400.21 |
| 4,813,490 | 3/1989 | Proudfoot | 273/32 B X |

*Primary Examiner*—George J. Marlo
*Attorney, Agent, or Firm*—Richard S. Faust

[57] ABSTRACT

Golf course aesthetics and golf course maintenance procedures are enhanced by the use of a novel compact rake head that is detachably secured to the golfer's sand wedge to smooth the surface of sand traps following sand shots. The use of the rake head permits the removal of the hundreds of conventional rakes which are typically positioned around the sand traps on a golf course and permits the maintenance of the sand traps and the grass adjacent the sand traps by the golf course maintenance crew without regard to the continuous moving of conventional rakes.

11 Claims, 5 Drawing Sheets

RAKE HEAD AND RAKE HEAD/GOLF CLUB COMBINATION FOR USE IN RAKING GOLF COURSE SAND TRAPS

FIELD OF THE INVENTION

The invention relates to golf course maintenance. More particularly, the invention relates to the smoothing of golf course sand traps following the execution of sand shots and the improved efficiency of sand trap maintenance and improved aesthetics achieved by removing conventional sand trap rakes from the golf course.

BACKGROUND OF THE INVENTION

It is well known that most golf courses include sand traps that are strategically placed along the fairways and at greenside as a form of obstacle for the golfer to overcome. On a modern 18-hole golf course there are normally about 3 to 5 sand traps per hole, or an average of about 70 to 90 traps per course. Traps vary in size from about 20 to 90 feet long, with a sand surface area ranging from about 400 to 5,000 square feet. Some of today's newer golf course designs have sand traps that extend the entire length of a hole, up to 250 yards in length. In 1989 the 24.7 million golfers in the United States played 474 million rounds of golf. With a realistic average of three sand shots per round, approximately 1.5 billion sand shots were played.

The time honored approach to golf course maintenance as it relates to sand traps has been that each trap is provided with several standard garden rakes that are placed at the edges of the trap. Each time a golfer plays a sand shot he is required by the etiquette of the game to locate one of the rakes and smooth his footprints and divot with the rake prior to leaving the trap area. As all golfers know, often a rake may not be found in proximity to his location in the trap, resulting in the frustration involved in locating a rake and an unwanted delay of play in a game already plagued by slow play. In addition to sand trap raking by individual golfers, at regular intervals the golf course maintenance crew will smooth the surface of all the traps using a motorized trap machine.

The presence of several rakes around each trap—as many as 6 to 10 rakes for larger traps—means that a typical golf course will have as many as 200 to 400 rakes scattered around its sand traps. These rakes are costly and must be replaced as they wear out, as they are lost and as they are damaged by improper use or occasional temper flare-ups. In addition, the rakes are inherently unsightly in a golf course environment. This aesthetic problem is exacerbated by the fact that golfers tend to randomly scatter rakes about the traps in various positions—sometimes in the surrounding grass, sometimes in the trap and at other times partly in the trap and partly on the grass.

During mechanized trap maintenance the golf course maintenance crew must first assure that the rakes have been removed from the trap prior to the sand smoothing operation. This of course would indicate that the best place for the rakes to be routinely placed is outside the trap. On the other hand, the grass immediately adjacent the traps must be mowed at regular intervals. Thus, for the convenience of the mowing crew, it would be best that the rakes always remain totally within the traps. Unfortunately, there is no best solution using the time honored approach.

SUMMARY OF THE INVENTION

The present invention provides a long overdue improvement in the maintenance of golf course sand traps and the mowed area immediately adjacent thereto. The invention permits the removal of conventional sand trap rakes from the golf course, resulting in elimination of the direct costs associated with the rakes and, perhaps more importantly, an enhanced aesthetic appearance of the golf course and enhanced efficiency of the golf course maintenance crew when performing the operations of mechanized sand trap smoothing and grass mowing adjacent the traps. These desirable results are achieved by providing each golfer or golfing group with a sand trap rake head that may be detachably secured to a golf club, preferably the grip end of a sand wedge, for raking sand traps during normal play.

In one aspect, the invention may be defined as a rake head for detachable securement at the butt end of a golf club grip to form a rake head/golf club combination useful to smooth the surface of golf course sand traps. The rake head is characterized by a compact design permitting a golfer to carry it with him during a round of golf for use in occasional sand trap raking operations. The rake head comprises a generally elongate main body portion having a lengthwise dimension suitable as the raking width for smoothing a sand trap surface and means for detachably securing the rake head to one end of the golf club. The securement means may take the form of a golf club shaft-receiving opening formed in the main body portion at a location intermediate the ends of the main body portion. A slot sized to receive a golf club shaft communicates with the opening. The opening is tapered from rear to front to present a tapered inner surface suitable to grippingly and detachably engage the butt end of a golf club by sliding engagement. The tapered opening preferably is so aligned with respect to the teeth as to orient the golf club shaft at an angle between about 30° to about 55° from horizontal in normal raking operations. The rake head includes means for engaging and smoothing the sand. In preferred embodiments the sand is engaged and smoothed by depending teeth that are convex on one side for sand smoothing and concave on the other side for sand plowing where it is necessary to fill in a low area.

In another aspect the invention may be defined as a system for improving the efficiency of golf course maintenance and the aesthetic appearance of the sand trap areas of a golf course. This system includes the steps of removing conventional rakes from the golf course; providing each golfer or golfing group with a sand trap rake head adapted for detachable securement to one end of a golf club; and each golfer faced with a sand trap shot carrying a rake head to the trap with him and, upon completion of the shot, detachably securing the rake head to a golf club and smoothing the disturbed surface of the sand trap with the rake head/golf club combination and thereafter detaching the rake head from the golf club for subsequent use following the next sand shot.

BRIEF DESCRIPTION OF THE DRAWINGS

Some of the objects having been stated, other objects will appear as the description proceeds, when taken in connection with the accompanying drawings, in which.

DETAILED DESCRIPTION OF THE INVENTION

While the present invention will be described more fully hereinafter with reference to the accompanying drawings, in which aspects of the preferred manner of practicing the present invention are shown, it is to be understood at the outset of the description which follows that persons of skill in the appropriate arts may modify the invention herein described while still achieving the favorable results of this invention. Accordingly, the description which follows is to be understood as being a broad, teaching disclosure directed to persons of skill in the appropriate arts, and not as limiting upon the present invention.

Figure 1:
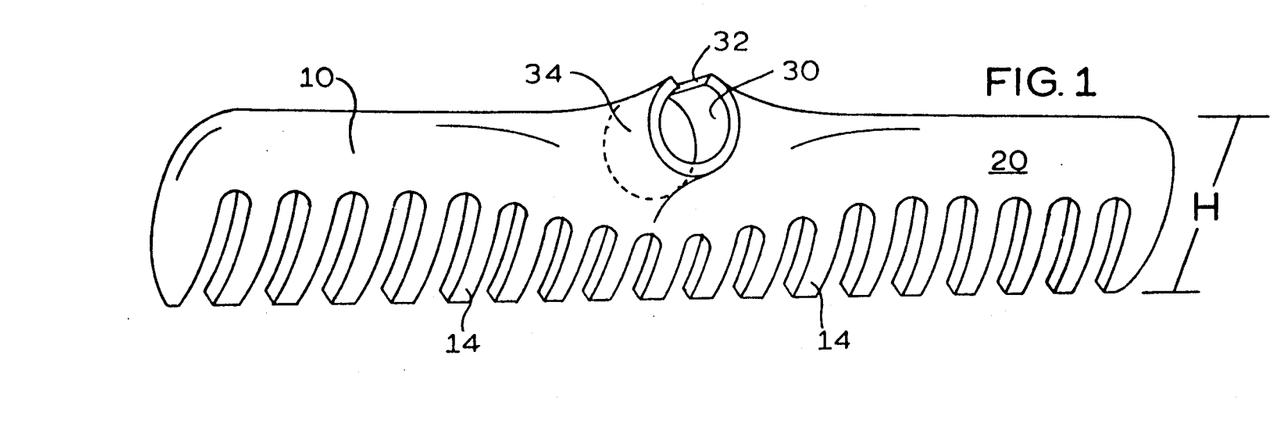
FIG. 1 is a pictorial view of a rake head constructed in accordance with the present invention.
Figure 2:
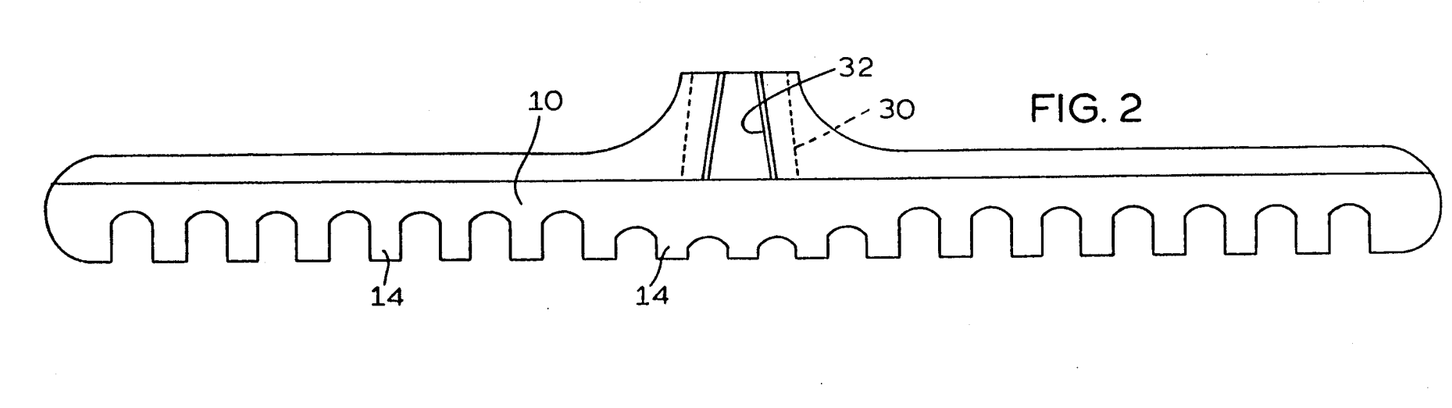
FIG. 2 is a top view of the rake head illustrated in FIG. 1.
Figure 3:
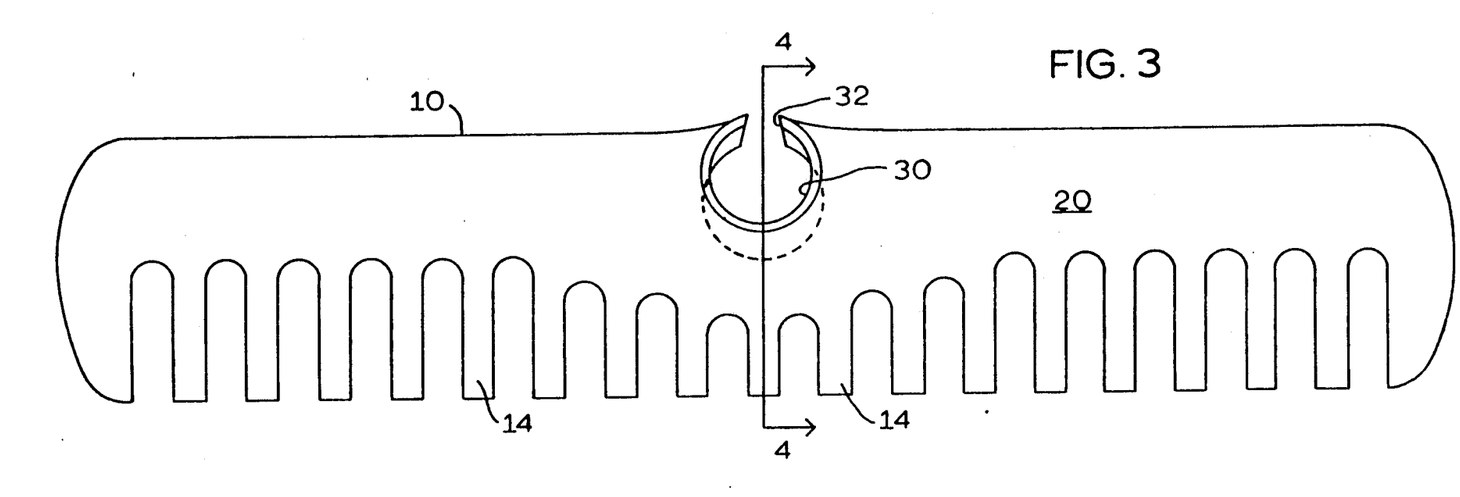
FIG. 3 is a front view of the rake head illustrated in FIGS. 1 and 2.

Referring to the drawings, and particularly to FIGS. 1-3, there is shown a sand trap rake head 10 constructed in accordance with the present invention. In the illustrated embodiment, rake head 10 is an integral, one-piece member formed by the injection molding of polypropylene or similar plastics material.

Rake head 10 includes an elongate body portion that has a length suitable for raking operations, for example, 13 inches long. The rake head has a height sufficient to accommodate multiple depending teeth 14 formed along the length of the head. In a preferred embodiment, the height of the rake head, as indicated by the reference character H in FIG. 1, is on the order of 2½ inches. It has been found that a suitable width for teeth 14 is approximately 5/16 inch with a spacing of approximately ⅜ inch between the teeth. These dimensions provide excellent smoothing by reducing the number and depth of furrows.

Figures 4, 5, 6, 7:
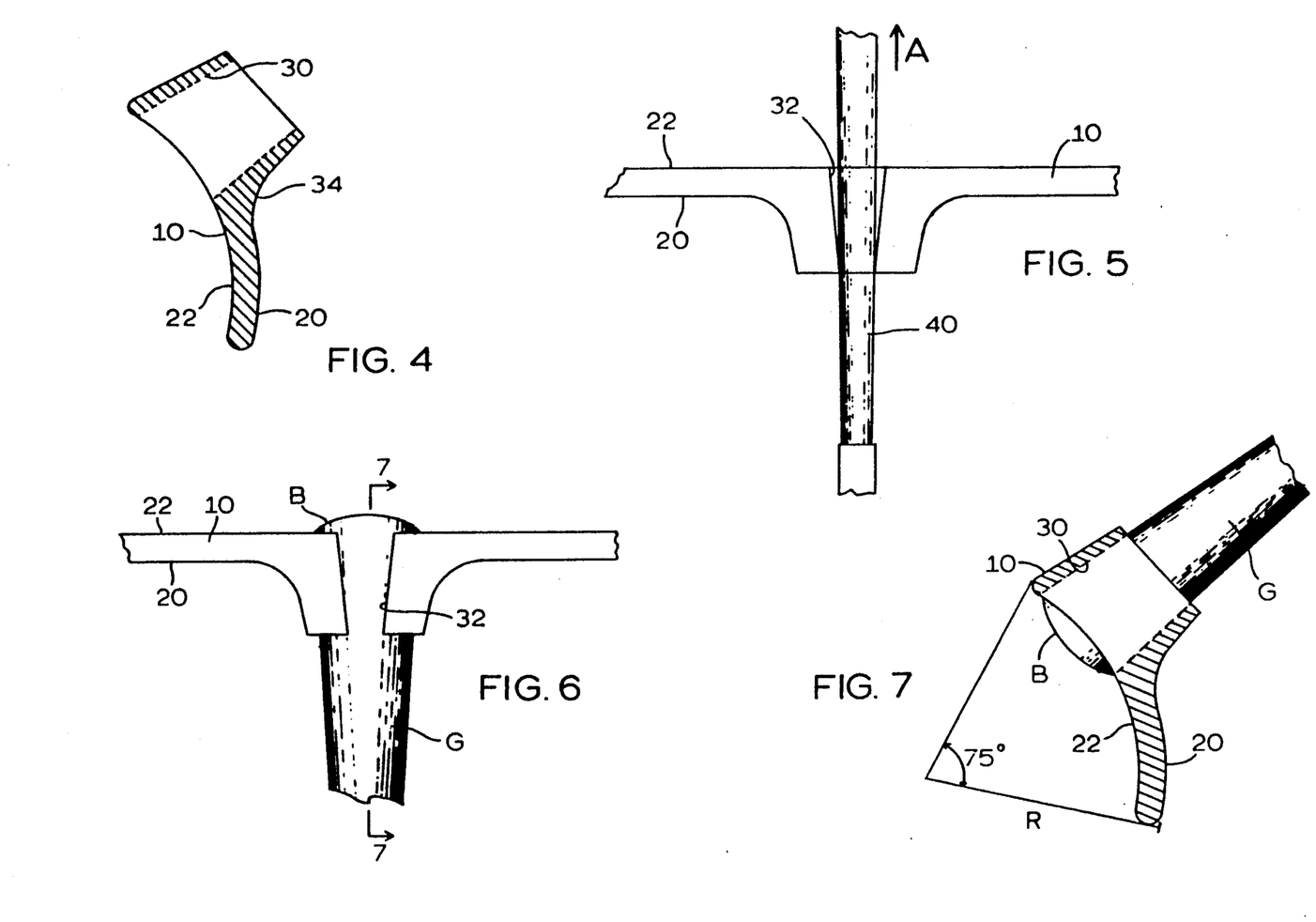
FIG. 4 is a section view taken substantially along line 4—4 of FIG. 3.
FIG. 5 is an enlarged top view showing a portion of the rake head positioned on a golf club shaft and being moved in the direction of arrow A toward the grip of the club.
FIG. 6 is a view similar to FIG. 5 showing the rake head in gripping, detachable securement at the butt end of the golf club grip.
FIG. 7 is a section view taken substantially along line 7—7 of FIG. 6.

As best shown in FIGS. 1 and 4, in the illustrated embodiment the main body of rake head 10 has a curvature which presents a lengthwise convex surface at the front face 20 and a lengthwise concave surface at the rear face 22. Teeth 14 possess the mentioned curvature of the main body portion so as to present a series of convex teeth during pulling, smoothing strokes and a series of concave teeth during pushing, plowing strokes, as described in more detail below.

Rake head 10 includes a golf club shaft-receiving opening 30 formed in the main body portion at a location intermediate the ends thereof and above the teeth 14. A slot 32 communicates with opening 30. Slot 32 is sized to receive a golf club shaft so that the shaft may reside within opening 30. Opening 30 is tapered from a larger diameter at the rear face 22 to a smaller diameter at the front. In a preferred embodiment, opening 30 tapers from a diameter of approximately 1 1/16 inch at the rear to a diameter of approximately 15/16 inch at the front. As best illustrated in FIGS. 3 and 4, opening 30 has a front to rear depth dimension on the order of 1 inch. This depth is achieved by provision of a sleeve in the form of an increased thickness of material in the areas generally indicated by the reference numeral 34. This area of increased thickness serves a secondary purpose of reinforcing the rake head against bending.

FIGS. 5-7 illustrate the operation of positioning rake head 10 at the butt end B of the golf club grip G to provide the rake head/golf club combination. First, rake head 10 is oriented so that the concave rear face 22 faces toward the grip. Next, shaft 40 of the golf club at any point between the golf club head and the grip is inserted through slot 32 so that the shaft resides within opening 30. Rather than having a uniform width, in the illustrated embodiment slot 32 is formed with an enlarged width at one end, for example at the rear as shown, to permit the golfer to easily locate shaft 40 in the slot and thereafter snap the shaft into opening 30 by means of a slight deformation of the material at the slot's smaller width dimension at the front of the device. Following insertion of shaft 40 into opening 30, rake head 10 is moved in the direction of arrow A of FIG. 5 until opening 30 progressively slides along the tapered golf club grip G and eventually resides at or near the butt end B of the grip as illustrated in FIGS. 6 and 7. In this position, rake head 10 is grippingly and detachably secured at the butt end of the grip sufficiently to hold it in place during the raking operation. It will be noted that all standard golf club grips taper to a larger diameter at the butt end. Usually the tapering increases within the last one to two inches of the grip so that the butt end actually flares out significantly. Because the circumferences of the butt ends of golf club grips are fairly uniform, the opening 30 as described has been found to secure rake head 10 at or near the butt end of all standard golf club grips.

As mentioned above, rake head 10 possesses a curvature along its entire length as best seen in FIGS. 4, 7, 9 and 10. This curvature has been built into rake head 10 for several reasons. First, the curvature enhances the structural integrity of the rake head substantially over that of a comparable "flat" structure. In this regard, the curvature reduces the likelihood of lengthwise bowing and also enhance the strength of the individual teeth 14. Second, the concave rear face 22 provides a comfortable and efficient shape for fitting the rake head into the rear trousers pocket of a golfer when he enters the sand trap. The concave shape rests comfortably and in conformity with the body shape. Third, as described in more detail below, the convex surface presented at front face 20 permits pulling the sand to achieve a smooth surface while the concave surface presented at rear face 22 permits pushing the sand in a plowing fashion to fill in low areas with sand.

In the illustrated embodiment, the curvature of rake head 10 as viewed from the side in FIG. 7 defines an arc of approximately 75° with a radius of curvature R to the external surface of rake head 10 of approximately 2¼ inches. These dimensions may be modified and it is believed that an arc in the range of 60°–100° is desirable and that a radius of curvature R in the range of 1 ¾ inches to 2 ¾ inches is desirable.

Figure 8:
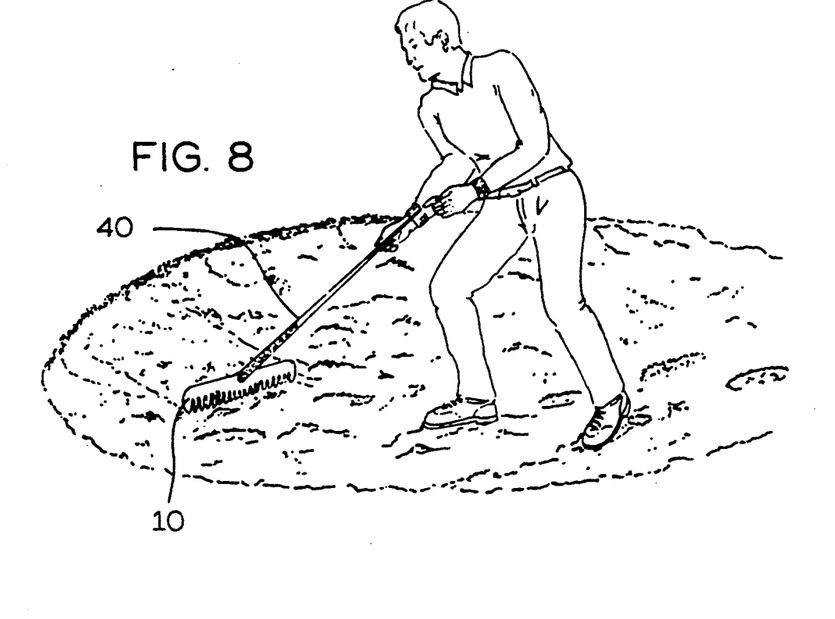
FIG. 8 is a pictorial representation of a golfer utilizing the rake head/golf club combination of the present invention to smooth the surface of a sand trap.

FIG. 8 illustrates a golfer's use of the rake head and golf club combination for smoothing his footsteps in a sand trap. The proper alignment of opening 30 permits the rake head to be maintained in the desired orientation for raking. In the preferred embodiment, the shaft has an orientation of about 42.5° from horizontal during raking operations, with a preferred range of 40° to 45° and an acceptable range of about 30° to about 55°. It will also be appreciated that the position of opening 30 at the top of the rake head keeps the grip portion of the golf club out of the sand during raking operations. It will also be appreciated that the gripping of the rake head at or near the butt end of the grip prevents the end of the grip from protruding beyond the rake head and causing an undesirable marking in the sand during raking.

In the illustrated embodiment, as best shown in FIG. 4, the center line of opening 30 is aligned substantially normal to the tangent of the outer face of the rake head. Thus, for the mentioned golf shaft raking orientation of 42.5° from horizontal, opening 30 is formed normal to the rake head at the appropriate location to achieve the desired orientation.

Figure 9:
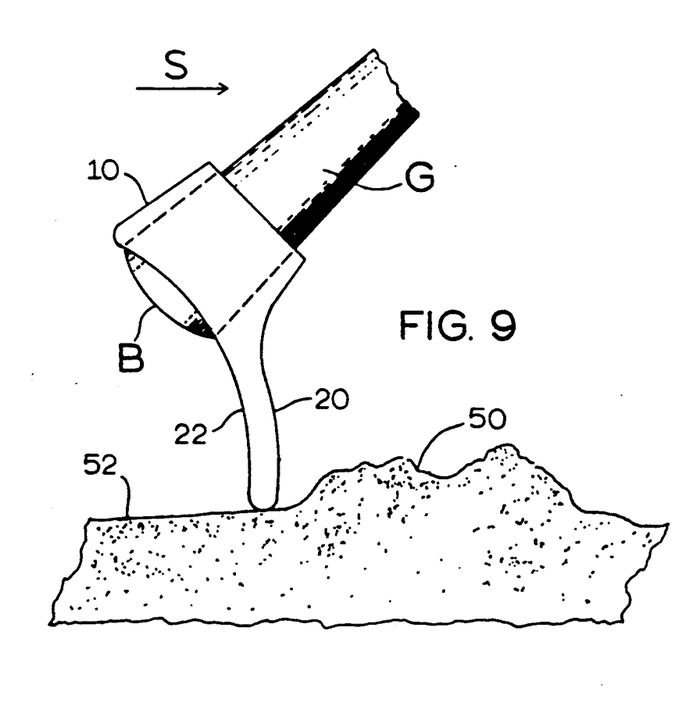
FIG. 9 is an enlarged side view of the rake head and butt end of the golf club grip in the pulling mode for smoothing the sand surface.

As mentioned above, the raking action may be in either a pulling or pushing mode depending upon the desired effect. Referring to FIG. 9, rake head 10 is shown in the pulling mode used to smooth the surface of the sand by the golfer pulling the golf club in the direction of arrow S. In the pulling mode the convex front face 20 of rake head 10, and the associated teeth, serve to smooth the initially rough sand surface 50 to a smoothed condition 52.

Figure 10:
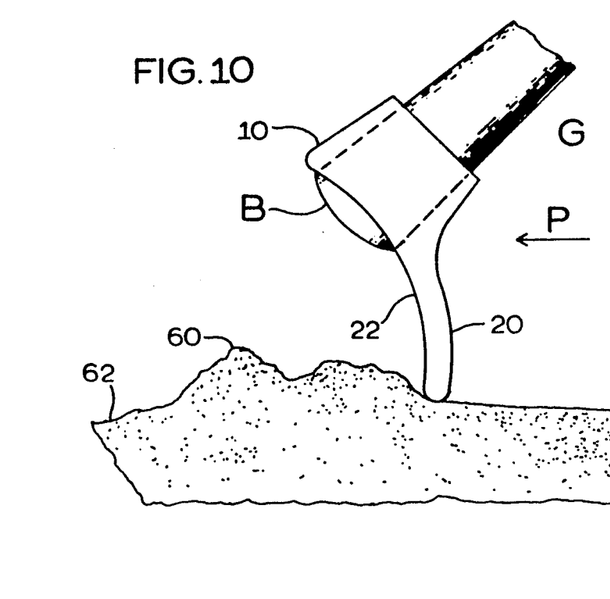
FIG. 10 is a view similar to FIG. 9, but showing the pushing mode for plowing said to fill in low areas.

FIG. 10 illustrates the use of the same rake head in a pushing mode wherein the rear concave face 22 engages a mound of excess sand 60 in the manner of a snowplow in order to fill in a low area 62. In the pushing mode the golf club is held in essentially the same orientation with respect to the sand and pushed in the direction of arrow P of FIG. 10.

Figure 11:
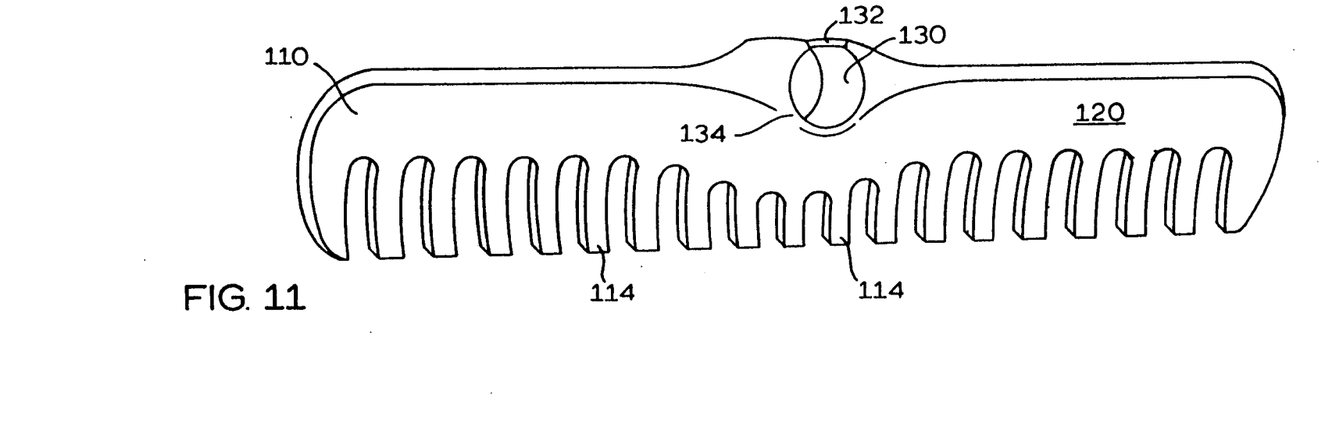
FIG. 11 is a pictorial view of an alternative embodiment of the rake head wherein the concave/convex curvature is reversed from the curvature of the rake head of FIGS. 1-10.
Figure 12:
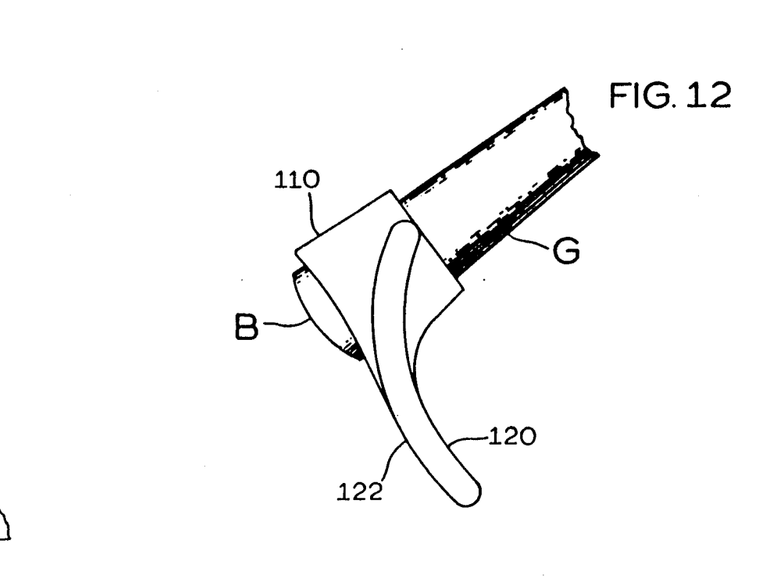
FIG. 12 is an end view of the rake head of FIG. 11 in place on a golf club grip.

FIGS. 11 and 12 illustrate an alternative embodiment rake head 110. Rake head 110 is constructed according to essentially the same principles as those of rake head 10 with the exception being that the concave/convex curvature is reversed. More particularly, rake head 110 defines a concave front face 120, a convex rear face 122 and teeth 114 with this curvature. Rake head 110 includes built-up material 134 that forms a sleeve in which the golf club grip-engaging opening 130 is located. Opening 130 tapers from a larger diameter at the rear to a smaller diameter in the front and includes a shaft-receiving slot 132. FIG. 12 illustrates the positioning of rake head 110 at the butt end B of grip G.

Rake head 110 is used in a similar fashion to the previously described rake head 10 with the exception that the pulling of the golf club creates a plowing action at concave face 120 and the pushing of the club creates a smoothing effect at convex rear face 122.

Among the many advantages of the invention is that the rake head, whether in the configuration of rake head 10 or rake head 110, may be easily formed of plastics material by injection molding techniques with conventional male and female mold parts without any need for cam injection or other complicated molding procedures.

As mentioned above, one aspect of the invention is that it provides a system for improving the efficiency of golf course maintenance and the aesthetic appearance of the sand trap areas of a golf course by each golfer using a detachably secured rake head/golf club combination to smooth sand traps during normal play. This system permits the removal of conventional sand trap rakes from the golf course, resulting in elimination of the direct costs associated with the rakes and, perhaps more importantly, an enhanced aesthetic appearance of the golf course and enhanced efficiency of the golf course maintenance crew when performing the operations of mechanized sand trap smoothing and grass mowing adjacent the traps. It will be appreciated that in accordance with the system of the present invention, the above mentioned desirable results may be achieved during a phase-in period or over the long term during which a golf course may decide to continue to provide, for example, one conventional rake per hole for use by golfers who may have forgotten or do not have a detachable rake head.

While the present invention has been described in connection with specific embodiments and a preferred system of use, it will be appreciated that modifications may be made without departing from the true spirit and scope of the invention.

That which is claimed is:

1. An integrally formed rake head for detachable securement at the butt end of a golf club grip to form a rake head/golf club combination useful to smooth the surface of golf course sand traps, said rake head being characterized by a compact design permitting a golfer to carry it with him during a round of golf to use in occasional sand trap raking operations and to permit raking with the golfer in a substantially erect posture, said rake head comprising:

a generally elongate main body portion having a lengthwise dimension suitable as the raking width for smoothing a sand trap surface and a height dimension suitable to accommodate a series of depending rake teeth, said main body portion having front and rear faces;

said main body portion having a curvature presenting a lengthwise convex surface on one face thereof and a lengthwise concave surface on the other face;

a series of depending rake teeth formed along the length of said main body portion, said teeth possessing the curvature of said main body portion;

a golf club shaft-receiving opening formed in said main body portion at a location intermediate the ends thereof, a slot communicating with said opening for permitting a golf club shaft to be inserted into the opening, said opening presenting an inner surface suitable to grippingly and detachably engage the butt end of a golf club by sliding engagement and being so aligned as to orient the golf club shaft at an angle between 30° to 55° from horizontal in normal raking operations.

2. A rake head as claimed in claim 1 wherein said golf club shaft-receiving opening is tapered from front to rear.

3. A rake head as claimed in claim 1 wherein said depending rake teeth have a width on the order of 5/16 inch and are spaced apart by approximately ⅜ inch.

4. A rake head as claimed in claim 1 wherein said golf club shaft-receiving opening is so aligned with respect to the teeth as to orient the golf club shaft at an angle between 40° and 45° from horizontal in normal raking operations.

5. A rake head as claimed in claim 1 wherein the main body portion of the rake head has a substantially uniform thickness except in the area of the golf club shaft-receiving opening where material is built up to provide a sleeve of increased thickness.

6. A rake head as claimed in claim 5 wherein said tapered opening has dimensions on the order of 1 inch depth, 1 1/16 inch diameter at the rear and 15/16 inch diameter at the front.

7. A rake head as claimed in claim 1 wherein the radius of curvature of the rake head is in the range from 1¾ inch to 2¾ inch.

8. A rake head as claimed in claim 1 wherein the rake head curvature defines an arc, as viewed from an end of the rake head, in the range from 60° to 110°.

9. A rake head as claimed in claim 1 wherein the radius of curvature of the rake head is in the range from 1¾ inch to 2¾ inch and the rake head curvature defines an arc, viewed from an end of the rake head, in the range from 60° to 110°.

10. A rake head as claimed in claim 1 wherein the radius of curvature of the rake head is approximately 2¼ inch and the rake head curvature defines an arc, as viewed from an end of the rake head, of approximately 75°.

11. A golf club and sand trap rake that can be quickly field assembled and disassembled by a golfer prior to and following each sand shot, said rake being characterized by the use of an available golf club as the handle and the use of a compact, easily carried, detachably secured rake head as the sand engaging and smoothing element, comprising:
- a conventional golf club having a shaft connecting a ball-striking head at one end thereof to a grip at the opposite end;
- a rake head comprising a generally elongate main body portion having a lengthwise dimension suitable as the raking width for smoothing a sand trap surface and a height dimension suitable to accommodate a series of depending rake teeth, said main body portion having front and rear faces;
- said main body portion having a curvature presenting a lengthwise convex surface on one face thereof and a lengthwise concave surface on the other face;
- a series of depending rake teeth formed along the length of said main body portion, said teeth possessing the curvature of said main body portion;
- a golf club shaft-receiving opening formed in said main body portion at a location intermediate the ends thereof, a slot communicating with said opening for permitting a golf club shaft to be inserted into the opening, said opening presenting an inner surface suitable to grippingly and detachably engage the butt end of a golf club by sliding engagement and being so aligned as to orient the golf club shaft at an angle between 30° to 55° from horizontal in normal raking operations, thereby permitting raking by the golfer while he is in a substantially erect posture.

* * * * *

UNITED STATES PATENT AND TRADEMARK OFFICE
CERTIFICATE OF CORRECTION

PATENT NO. : 6,094,456
DATED : July 25, 2000
INVENTOR(S) : Hiroaki Ueda

It is certified that error appears in the above-identified patent and that said Letters Patent is hereby corrected as shown below:

Please delete "Priority Data 6-562000" and insert -- Priority Data 6-56200 --.

Abstract,
Line 3, delete "header" insert -- Header --.

Column 1,
Line 20, delete "," insert -- . --;
Line 48, delete "IPEG" insert -- MPEG --

Column 2,
Line 55, delete "with" insert -- which --

Column 3,
Line 2, delete "br" insert -- by --;
Line 25, delete "to" insert -- is --;
Line 27, delete "proceeding" insert -- processing --

Column 4,
Line 33, delete "in" insert -- is --;
Line 39, delete "In" insert -- in --;
Line 66, delete "devise" insert -- device --

Column 6,
Line 8, delete "in" insert -- is --;
Line 17, delete "it" insert -- is --

Column 7,
Line 3, delete "28" insert -- 18 --;
Line 56, delete "UsrStart" insert UserStart --

Column 8,
Line 26, delete "7" insert -- I --;
Line 59, delete "notion" insert -- motion --

Column 10,.
Line 19, delete "rot" insert -- not --;
Line 48, delete "riot" insert -- not --;
Line 56, delete "a" insert -- B --

UNITED STATES PATENT AND TRADEMARK OFFICE
CERTIFICATE OF CORRECTION

PATENT NO. : 6,094,456
DATED : July 25, 2000
INVENTOR(S) : Hiroaki Ueda

It is certified that error appears in the above-identified patent and that said Letters Patent is hereby corrected as shown below:

Column 11,
Line 60, delete "6" insert -- 8 --

Column 12,
line 25, delete "in" insert -- is --;
Line 30, after "variable" insert -- y --;
Line 47, delete "cflg" insert -- cflag --

Column 14,
Line 35, delete "cave" insert -- case --

Column 15,
Line 39, delete "in" insert -- m --;
Line 41, delete "15" insert -- 16 --

Column 16,
Line 53, delete "container" insert -- contained --;

Column 17,
Line 61, delete "—" insert -- = --

Column 18,
Line 4, delete "an" insert -- as --;
Line 6, delete "began" insert -- been --;
Line 54, delete "I" insert -- 1 --

Column 19,
Line 22, delete "slide" insert -- slice --;
line 26, delete "illustration" insert -- illustrated --

Column 20,
Line 21, after "variable" insert -- u --;
Line 34, delete "in" insert -- is --;
Line 39, after "variable" insert -- V --;
Line 43, delete "DCR" insert -- DCT --;

UNITED STATES PATENT AND TRADEMARK OFFICE
CERTIFICATE OF CORRECTION

PATENT NO. : 6,094,456
DATED : July 25, 2000
INVENTOR(S) : Hiroaki Ueda

It is certified that error appears in the above-identified patent and that said Letters Patent is hereby corrected as shown below:

<u>Column 20 contd.</u>
Line 56, delete "stop" insert -- step --;
Line 59, delete "cot" insert -- cos --;
Line 63, delete "net" insert -- not --;

<u>Column 21,</u>
Line 9, delete "not" insert -- of --;
Line 16, delete "DCR" insert -- DCT --;
Line 37, delete "594" insert -- 394 --;
Line 65, delete "intention" insert -- invention --.

Signed and Sealed this

Twenty-fifth Day of September, 2001

Attest:

*Attesting Officer*

NICHOLAS P. GODICI
*Acting Director of the United States Patent and Trademark Office*